United States Patent
Bacher et al.

(10) Patent No.: US 11,102,941 B2
(45) Date of Patent: Aug. 31, 2021

(54) SPROUT LID FOR CONTAINER

(71) Applicant: MASONTOPS, INC., Toronto (CA)

(72) Inventors: Michael Bacher, Toronto (CA); Philip Baron, Toronto (CA); Brett Molnar, Toronto (CA)

(73) Assignee: MASONTOPS, INC., Toronto (CA)

( * ) Notice: Subject to any disclaimer, the term of this patent is extended or adjusted under 35 U.S.C. 154(b) by 363 days.

(21) Appl. No.: 16/027,858

(22) Filed: Jul. 5, 2018

(65) Prior Publication Data

US 2019/0008105 A1 Jan. 10, 2019

Related U.S. Application Data

(60) Provisional application No. 62/529,283, filed on Jul. 6, 2017.

(51) Int. Cl.
| | |
|---|---|
| *A01G 9/02* | (2018.01) |
| *A01G 31/02* | (2006.01) |
| *B65D 51/24* | (2006.01) |
| *B65D 43/02* | (2006.01) |
| *A01G 9/029* | (2018.01) |

(52) U.S. Cl.
CPC ........... *A01G 31/02* (2013.01); *A01G 9/0293* (2018.02); *B65D 43/0231* (2013.01); *B65D 51/24* (2013.01)

(58) Field of Classification Search
CPC .............................. A01G 9/0293; A01G 31/02
USPC ............................................................ 47/61
See application file for complete search history.

(56) References Cited

U.S. PATENT DOCUMENTS

| | | | | |
|---|---|---|---|---|
| 2,930,162 | A * | 3/1960 | Mulford ................. | A01G 31/02 47/78 |
| 4,006,557 | A * | 2/1977 | Sawyer .................. | A01G 31/02 47/61 |
| 4,171,593 | A * | 10/1979 | Bigglestone ........... | A01G 27/04 47/79 |
| 4,180,941 | A * | 1/1980 | Korematsu ............ | A01G 31/02 47/14 |
| 5,225,342 | A * | 7/1993 | Farrell ..................... | A01G 5/06 435/430 |
| 5,244,113 | A * | 9/1993 | Stymiest .............. | B65D 51/242 215/228 |
| D388,327 | S | 12/1997 | Radosevich | |
| 5,806,242 | A * | 9/1998 | Park ....................... | A01G 27/06 47/81 |
| 5,913,964 | A * | 6/1999 | Melton .................. | A47G 19/16 99/322 |
| 5,921,025 | A * | 7/1999 | Smith .................... | A01G 27/06 47/48.5 |

(Continued)

FOREIGN PATENT DOCUMENTS

| | | |
|---|---|---|
| CN | 204070045 U | 1/2015 |
| CN | 303371143 | 9/2015 |

(Continued)

*Primary Examiner* — David J Parsley
(74) *Attorney, Agent, or Firm* — McAndrews, Held & Malloy, Ltd.

(57) ABSTRACT

A sprout lid for use with a container to sprout seeds and or beans is provided which may include a recess feature which may allow the container to be filled with water without removing the sprout lid from the container, as well as allowing proper airflow in the container. The sprout lid may also be used to rinse, strain, and drain seeds and or beans in the container.

27 Claims, 5 Drawing Sheets

(56) References Cited

U.S. PATENT DOCUMENTS

| | | | |
|---|---|---|---|
| 6,622,430 B1* | 9/2003 | Lai | A01G 27/005 47/79 |
| 7,240,457 B1* | 7/2007 | Chang | A01G 27/008 47/40.5 |
| 8,631,957 B2* | 1/2014 | Dart | B65D 43/0212 220/254.3 |
| D730,235 S* | 5/2015 | Korzeniowski | D11/148 |
| D745,432 S* | 12/2015 | Jawarski | D11/164 |
| D779,325 S | 2/2017 | Vigoureux | |
| 2005/0178054 A1* | 8/2005 | Hsu | A01G 18/64 47/1.1 |
| 2018/0273260 A1* | 9/2018 | Lin | A47G 19/14 |

FOREIGN PATENT DOCUMENTS

| | | |
|---|---|---|
| EP | 0155923 A2 | 9/1985 |
| KR | 200166919 Y1 | 2/2000 |
| KR | 200170535 Y1 | 2/2000 |

\* cited by examiner

SPROUT LID FOR CONTAINER

CROSS REFERENCE TO RELATED APPLICATIONS

This application claims priority from and the benefit of U.S. Provisional Application Ser. No. 62/529,283, entitled "SPROUT LID FOR CONTAINER," filed Jul. 6, 2017, which is hereby incorporated by reference in its entirety for all purposes.

BACKGROUND

This disclosure relates to lids and containers for sprouting seeds. It may be desirable to sprout seeds inside of a container, such as a jar or a mason jar. Sprouts can be harvested inside a container by soaking seeds or beans (hereinafter, "seeds" for simplicity) for several hours, rinsing daily, and then draining. The process may be repeated until the seeds have sprouted. The process may involve or require some sort of screen or strainer to rinse and drain the sprouts.

SUMMARY

An apparatus and systems are disclosed for a sprout lid for a container, substantially as illustrated by and described in connection with at least one of the figures, as set forth more completely in the claims.

Disclosed example lids configured to engage with a container include an upper surface including a plurality of holes, wherein the upper surface includes a recess, and wherein the recess includes a plurality of recess holes. In some example lids, at least one of the plurality of recess holes has either a different size or a different shape than at least one the plurality of holes. In some example lids, the recess comprises a tapered cylindrical shape. In some example lids, the lid includes a plurality of upwardly-projecting legs.

Some example lids further include a gasket configured to make a substantially water-tight seal when the lid is engaged with the container. In some example lids, the gasket-holding rib includes a break. In some example lids, the gasket is removable from the lid.

Some example lids further include a band on an outer perimeter of the lid extending downwardly from the lid, the band including threads configured to secure the lid to the container.

Disclosed example lid and container systems include a container, and a lid configured to engage with the container, the lid comprising an upper surface including a plurality of holes, wherein the upper surface includes a recess, and wherein the recess includes a plurality of recess holes.

BRIEF DESCRIPTION OF THE DRAWINGS

The figures are not necessarily to scale. Where appropriate, similar or identical reference numbers are used to refer to similar or identical components.

DETAILED DESCRIPTION

There may be several disadvantages with known sprouting processes using a container, where the container is, for example, a mason jar. If the sprouts do not receive proper air flow during the sprouting process, excess moisture and restricted air flow can lead to mold growth. Further, straining the seeds can be difficult, especially when harvesting various seed sizes. Often the user may desire various screen sizes to filter different mediums. Further, the container can be difficult to fill with water during the rinsing process based on the screen that is used. Not all water may go directly in to the container, or the device may need to be removed entirely before filling the container, causing user inconvenience. Another disadvantage may be that during the draining process, the user may be required to awkwardly position the container at an angle. Another problem may be that the material used to cover the container is often not reusable, and not easy to clean.

One known sprout lid is a reusable plastic lid with a screen molded into the top. Such plastic lids often have several models in which the hole diameter varies to accommodate small, medium, and large size seeds or beans.

Another known solution is to use cheese cloth or mesh and an elastic band to strain sprouts in a jar. Another known solution is to implement a flat plastic screen along with a pre-existing mason jar metal band. Such lid strainer solutions may not allow for proper airflow due to restricted screen patterns and improper draining abilities. These known solutions may require a secondary item to prop the container on an angle and fully drain. Further, some of the plastic lids may require multiple components to properly strain different seed sizes. In addition, these lids may be difficult to fill with water as the water may splash off the lid rather than going into the container.

The present disclosure overcomes these problems and provides a sprout lid that may include a recess feature. The recess may extend down into the container. The recess may have a tapered cylindrical shape with a rounded bottom and long slots on the sides. The recess may promote aeration as the recess extends into the container and may have elongated slots in the sides which, when combined with the hole pattern on the top surface, may promote multidirectional air flow. Multidirectional air flow via the recess may prevent mold, whereas other known solutions may not have proper air flow leading to excess moisture in the container. The recess may also prevent splashing when filling the container with water. Existing solutions may not be easy to fill with water and may deflect the water from going in the container, or the user must remove the strainer/lid to drain. The recess may allow the user to fill the container with water without removing the lid, and without splashing water outside of the container.

The sprout lid may include an integrated gasket system, in which a circular rib secures the gasket in place while leaving a small break in the rib so the gasket can be removed. The integrated gasket in the inventive design may create a sufficient seal around the lip of the container to ensure water is only draining out from the top, and not down the sides of the container. Some existing solutions do not seal around the lip of the container.

In addition, the sprout lid may include raised "feet" or "legs" that extend upwardly from the top surface of the lid. The container may rest on these feet when turned upside down to promote drainage. This may be advantageous because some existing solutions may require the user to tilt the container on its side using a secondary object in order to get proper drainage. The diameter of the holes in the lid may create a proper straining environment that works for multiple seed sizes.

The container lid may also incorporate a faceted grip that may include, for example 12 segments, each of which may prevent rolling when the container/lid is placed on its side. A container may be placed on its side to achieve improved air flow. Existing solutions may require the container to be tilted on its side, upside down on an angle, and may not promote adequate air flow into the container. The segments of the present disclosure may also make removing/attaching the lid to the container easier. More or less segments are possible. The segments may be substantially flat, according to one technique.

Figure 1:
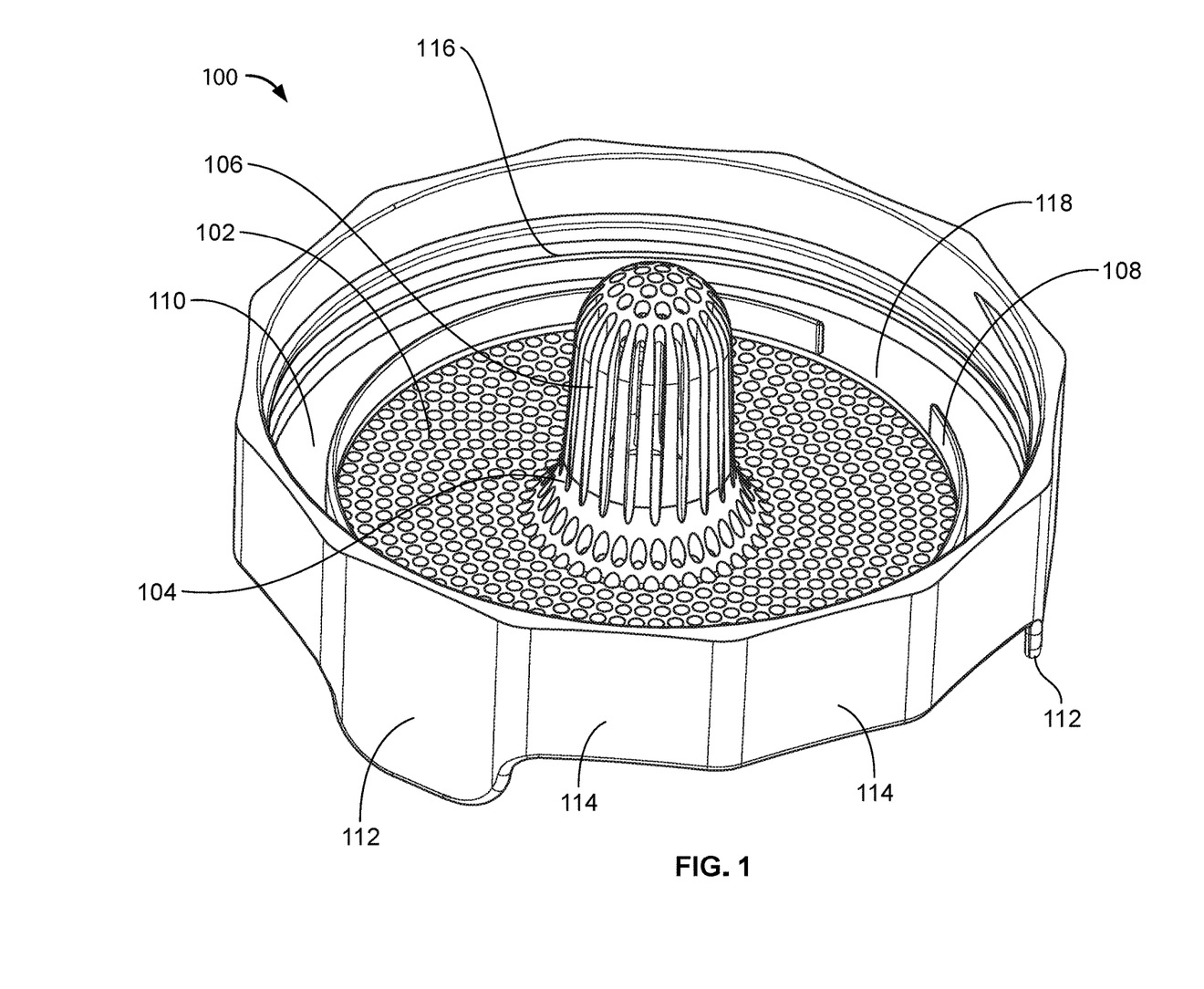
FIG. 1 shows an exemplary sprout lid to engage with a container in accordance with aspects of this disclosure.
Figure 2:
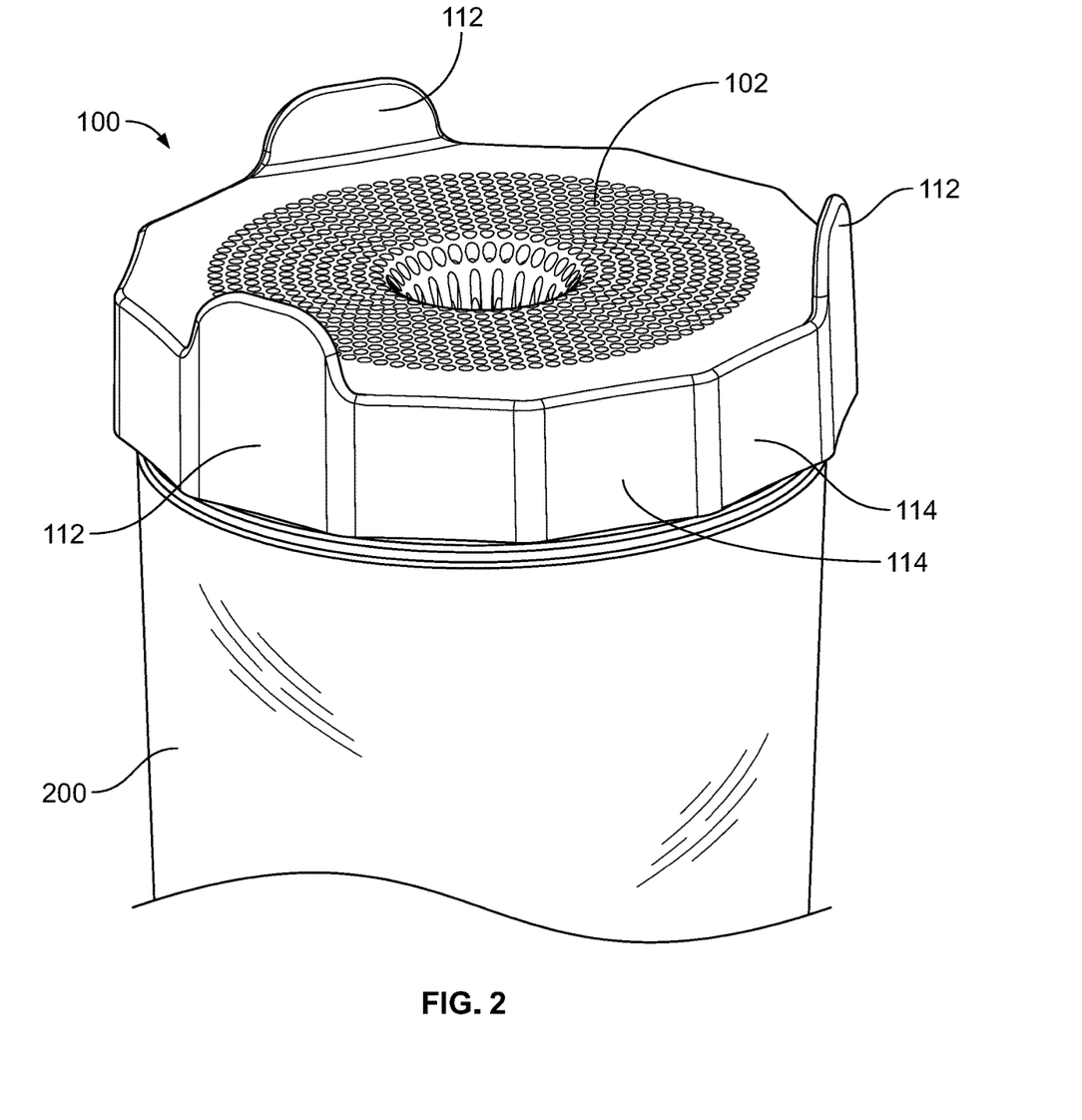
FIG. 2 shows an exemplary sprout lid engaged with a container in accordance with aspects of this disclosure.

FIG. 1 illustrates an inverted perspective view of an exemplary sprout lid 100 configured to engage with a container in accordance with aspects of this disclosure. FIG. 2 illustrates the exemplary sprout lid 100 engaged with a container 200 (e.g., a mason jar, such as a standard mason jar). The container 200 may have a circular opening, and the sprout lid 100 may be sized to engage with a container having an opening of a certain size. For example, exemplary containers may have openings 2.75 inches in diameter or 3.38 inches in diameter. Returning to FIG. 1, the sprout lid 100 may have an upper surface with a plurality of holes 102. In some examples, the holes 102 may be round. The diameter of the holes 102 in the sprout lid 100 may create a proper straining environment that works for multiple seed and beans sizes. For example, each of the holes of the plurality of holes 102 may be approximately 1.75 millimeters in diameter.

The upper surface of the sprout lid 100 also may have a recess 104 which extends downward into the container 200 when the sprout lid 100 is engaged with the container 200. The recess 104 may also contain holes. The recess 104 may have a tapered cylindrical shape with a rounded bottom. The rounded bottom may also have holes. The holes 106 on the elongated region of the recess 104 may have an elongated shape, which may be different from the holes 102 on the rest of the upper surface of the sprout lid 100. The elongated holes 106 may simplify the manufacturing molding process (injection and removal) by eliminating cavities along the Y axis (i.e., the axis perpendicular to the upper surface of the lid) of the device. Exemplary holes 106 in the elongated region of the recess 104 may be approximately 29 millimeters in length and 1.25 millimeters in width. In some examples however, the holes 106 in the elongated region of the recess 104 have the same size and/or shape as the holes 102 on the rest of the upper surface of the sprout lid 100. The recess may promote aeration deeper into the container than in existing sprout lids. In an exemplary sprout lid, the recess 104 may extend approximately 34 millimeters from the upper surface of the sprout lid.

Figure 3:
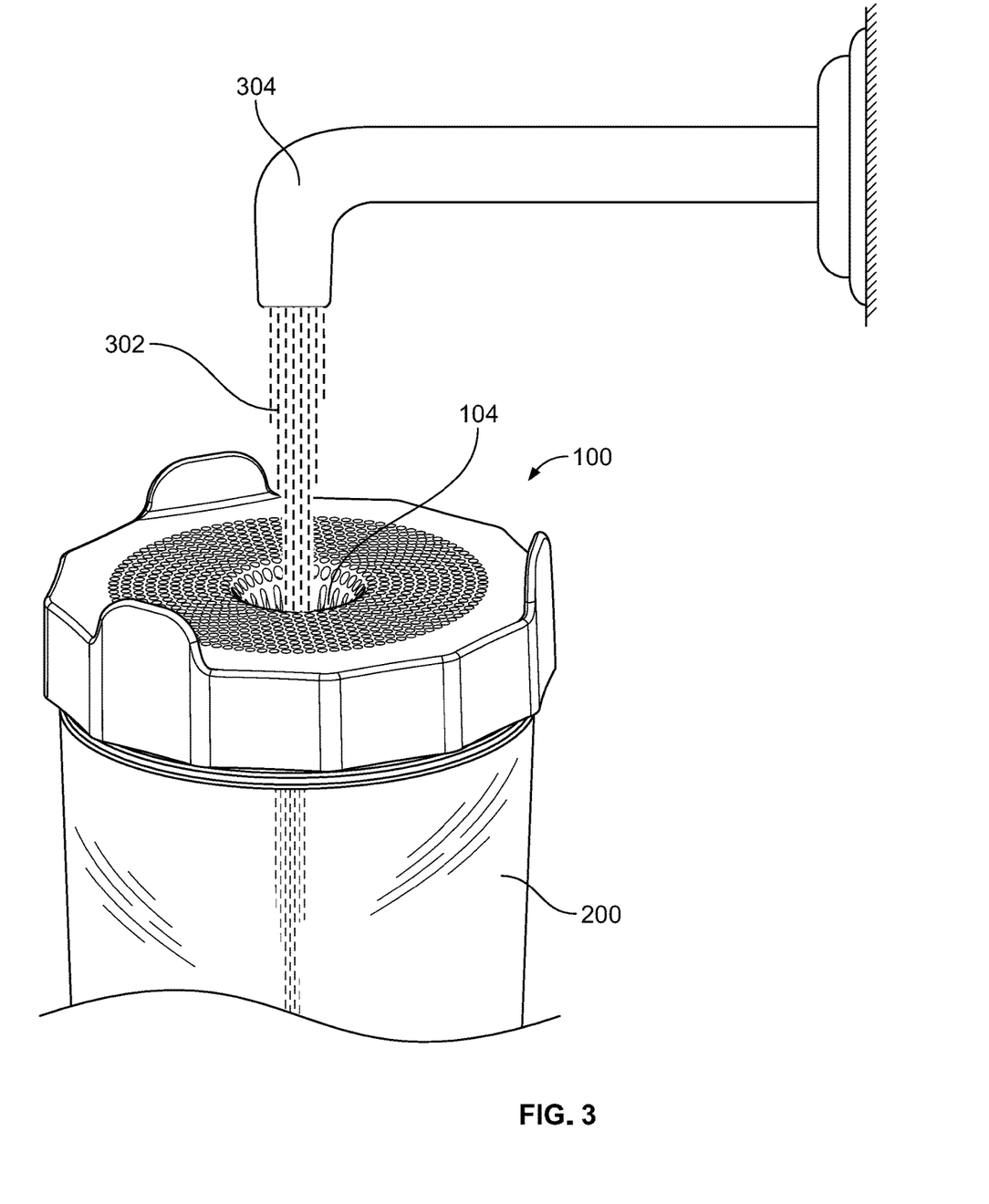
FIG. 3 shows a container engaged with an exemplary sprout lid being filled with water in accordance with aspects of this disclosure.

As shown in FIG. 3, the container 200 may be filled with water 302 from a faucet 304 (spigot, hose, tap etc.) without removing the sprout lid 100 from the container 200. The recess 104 may prevent splashing when filling the container 200 with water 302 and may ensure the water 302 is flowing directly into the container 200, which allows a user to fill the container 200 with water 302 without removing the sprout lid 100 from the container 200.

Returning to FIG. 1, the sprout lid 100 may also include a gasket system, in which a circular rib 108 secures the gasket 110 in place while leaving a small break 118 in the rib so the gasket 110 can be removed. The integrated gasket system may create a sufficiently air and/or water penetration resistant seal around the lip of the container 200, when the sprout lid 100 is engaged with the container 200, to ensure water only drains out from the top, and not down the sides of the container. In some embodiments, the gasket 110 may be integrated with the sprout lid 100.

Figure 4:
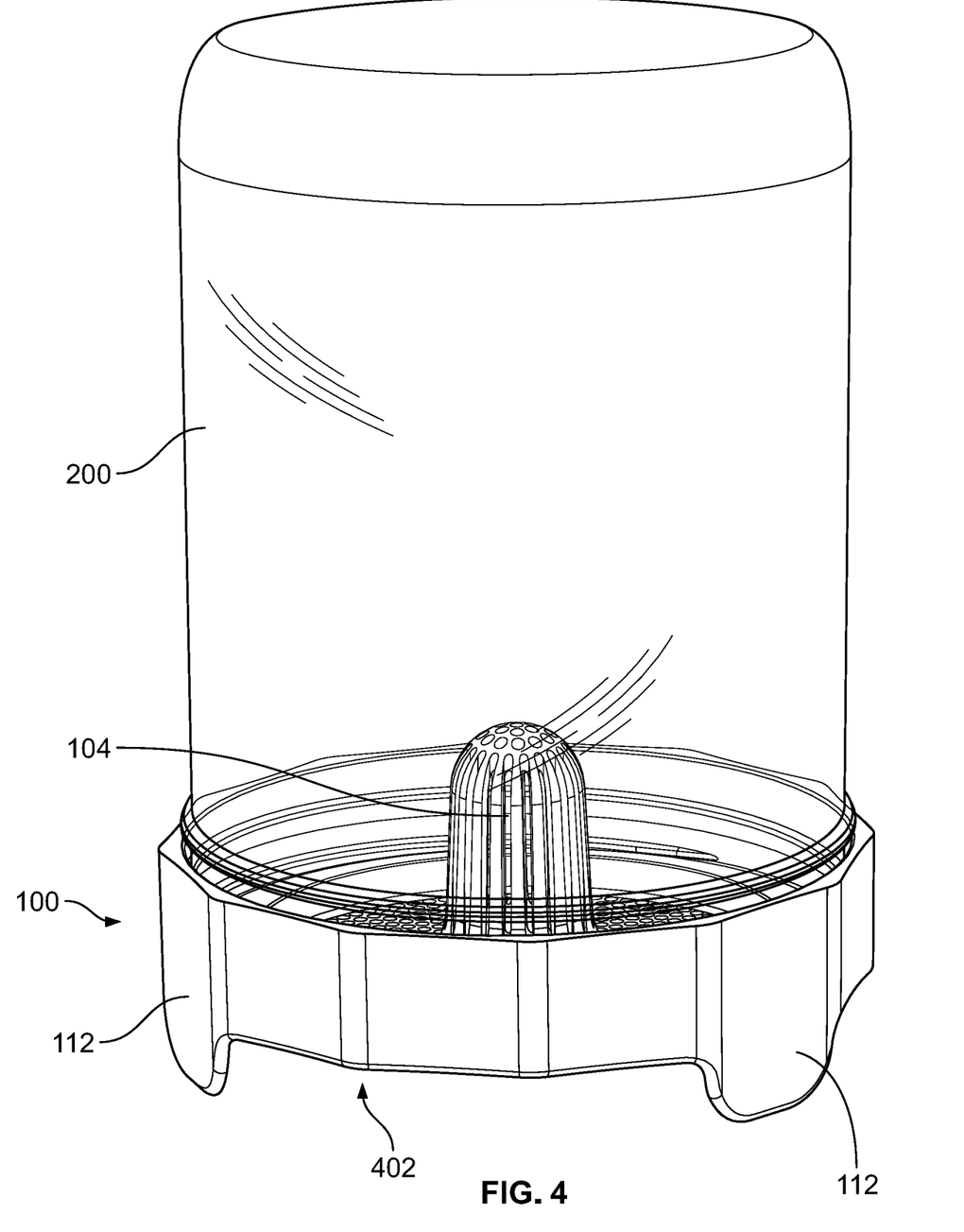
FIG. 4 shows a container resting upside down on an exemplary sprout lid in accordance with aspects of this disclosure.

The sprout lid 100 may also include legs 112, which may provide a suitable clearance 402 such that water can drain out of the container 200 and not sit in an obstructing pool when the container 100 and lid 200 is placed upside down, as shown in FIG. 4. The legs may be approximately 10 mm high, as measured from the upper surface of the sprout lid. As shown, the legs 112 provide clearance 402 between a resting surface and the holes 102 on the upper surface of the sprout lid 100 to permit hands-free draining.

Figure 5:
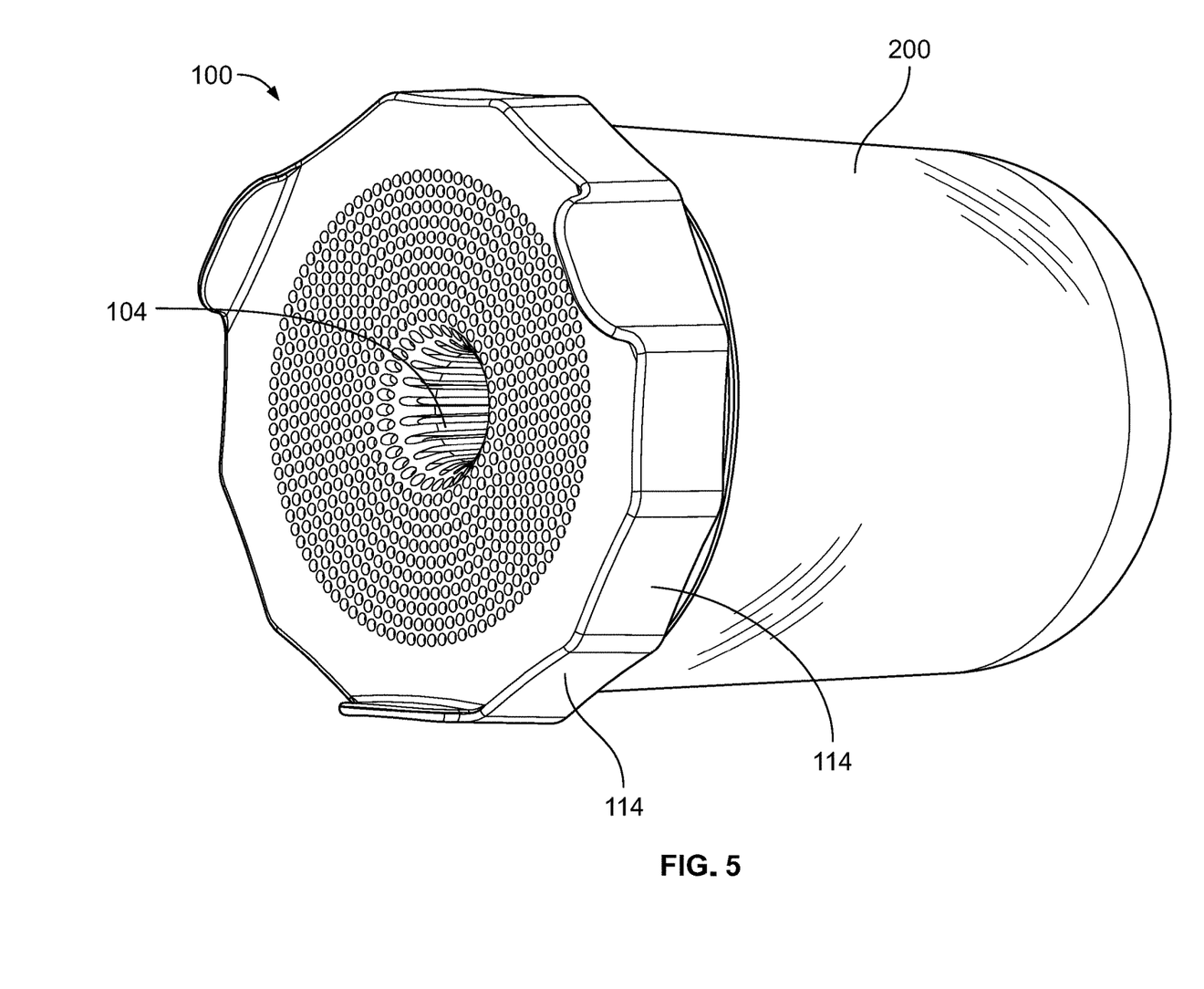
FIG. 5 shows a container engaged an exemplary sprout lid, wherein the container is resting on its side in accordance with aspects of this disclosure.

Returning to FIG. 1, the sprout lid 100 also may include movement-preventing segments 114 (e.g., flat facets) along the outer perimeter of the sprout lid 100. For example, there may be 12 segments 114, although more or less segments 114 are possible. When the sprout lid 100 is placed on its side when engaged with the container 200, for example, in order to improve air flow, as shown in FIG. 5, these segments 114 may prevent the container from rolling. The segments 114 may also act as a faceted grip, making removing and/or attaching the sprout lid 100 to the container 200 easier. The segments may be substantially flat, according to one technique.

Returning to FIG. 1, the sprout lid 100 may include threads 116 to securely engage with a container 200, as shown in FIG. 2. The threads 116 may be included on the inner portion of a band extending downwards from the outer perimeter of the upper surface of the sprout lid 100. When attaching the sprout lid 100 to the container 200, the threads 116 may engage with corresponding threads on the container (not shown) in order to secure the sprout lid 100 to the container 200. The threads 116 may also disengage with corresponding threads on the container 200 to non-destructively disengage the sprout lid 100 from the container 200.

While the present apparatus and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present apparatus and/or system are not limited to the particular implementations disclosed. Instead, the present method and/or system will include all implementations falling within the scope of the appended claims, both literally and under the doctrine of equivalents.

What is claimed is:

1. A lid configured to engage with a container, the lid comprising:
an upper surface including an outer annular collar region circumscribing an inner drain region,
a lower surface, and a plurality of legs configured to support the lid and the engaged container when in an upside-down orientation and the lid is resting on a surface, wherein the plurality of legs are upwardly-projecting when the lid and the engaged container are in a right-side-up orientation and are downwardly-projecting when the lid and the engaged container are in the upside-down orientation;
wherein the inner drain region includes a recess,
wherein the recess comprises an elevation below a lowest elevation of the outer annular collar region;
wherein the inner drain region includes a plurality of drain holes;
wherein the recess includes a plurality of recess holes,
wherein the plurality of drain holes and the plurality of recess holes extend from the upper surface through to the lower surface to allow fluid flow from the upper surface to the lower surface without disengaging the lid from the container when filling the container with water, and to allow fluid flow from the lower surface to the upper surface without disengaging the lid from the container when draining water out of the container in the upside-down orientation, and
wherein, when the lid is in the upside-down orientation, the plurality of legs provide clearance between the surface and the plurality of drain holes and recess holes such that water can drain out of the container when the lid and the engaged container are resting on the surface.

2. The lid of claim 1, wherein at least one of the plurality of recess holes has at least one of a different size or a different shape than at least one of the plurality of drain holes.

3. The lid of claim 1, wherein the recess comprises a tapered cylindrical shape.

4. The lid of claim 1, wherein an outer perimeter of the lid includes a plurality of motion-preventing segments.

5. The lid of claim 1, further comprising a gasket configured to make a substantially water-tight seal when the lid is engaged with the container.

6. The lid of claim 5, further comprising a gasket-holding rib located on the interior of the gasket.

7. The lid of claim 6, wherein the gasket-holding rib comprises a break.

8. The lid of claim 5, wherein the gasket is removable from the lid.

9. The lid of claim 1, further comprising a band on an outer perimeter of the lid extending downwardly from the lid, the band comprising threads configured to secure the lid to the container.

10. A container and lid system comprising:
a container; and
the lid of claim 1,
wherein the container and the lid are configured to engage with each other.

11. A lid configured to engage with a container, the lid comprising:
a surface including an outer annular collar region circumscribing an inner drain region, and
a plurality of legs configured to support the lid and the engaged container when in an upside-down orientation and the lid is resting on a surface, wherein the plurality of legs are upwardly-projecting when the lid and the engaged container are in a right-side-up orientation and are downwardly-projecting when the lid and the engaged container are in the upside-down orientation;
wherein the inner drain region includes a recess,
wherein the recess comprises an elevation below a lowest elevation of the outer annular collar region;
wherein the inner drain region includes a plurality of drain holes;
wherein the recess includes a plurality of elongated slots,
wherein at least one of the plurality of elongated slots has a different size or shape than at least one of the plurality of drain holes,
wherein the lid has a thickness, and
wherein the plurality of drain holes and the plurality of elongated slots extend through the thickness of the lid to allow fluid flow through the lid without disengaging the lid from the container when filling the container with water and when draining water out of the container in the upside-down orientation, and
wherein, when the lid is in the upside-down orientation, the plurality of legs provide clearance between the surface and the plurality of drain holes and recess holes such that water can drain out of the container when the lid and the engaged container are resting on the surface.

12. The lid of claim 11, wherein the recess comprises a tapered cylindrical shape.

13. The lid of claim 11, wherein an outer perimeter of the lid includes a plurality of motion-preventing segments.

14. The lid of claim 11, further comprising a gasket configured to make a substantially water-tight seal when the lid is engaged with the container.

15. The lid of claim 14, further comprising a gasket-holding rib located on the interior of the gasket.

16. The lid of claim 15, wherein the gasket-holding rib comprises a break.

17. The lid of claim 14, wherein the gasket is removable from the lid.

18. A container and lid system comprising:
a container; and
the lid of claim 11,
wherein the container and the lid are configured to engage with each other.

19. A lid configured to engage with a container, the lid comprising:
a surface including an outer annular collar region circumscribing an inner drain region; and
a plurality of legs configured to support the lid and the engaged container when in an upside-down orientation and the lid is resting on a surface, wherein the plurality of legs are upwardly-projecting when the lid and the engaged container are in a right-side-up orientation and are downwardly-projecting when the lid and the engaged container are in the upside-down orientation;
wherein the inner drain region includes a plurality of coplanar holes;
wherein the inner drain region includes a recess,
wherein the recess comprises a plurality of elongated slots oriented at least partially along a vertical dimension,
wherein at least one of the plurality of elongated slots has a different size or shape than at least one of the plurality of coplanar holes,
wherein the lid has a thickness, and
wherein the plurality of coplanar holes and the plurality of elongated slots extend through the thickness of the lid to allow fluid flow through the lid without disengaging the lid from the container when filling the container with water and when draining water out of the container in the upside-down orientation, and
wherein, when the lid is in the upside-down orientation, the plurality of legs provide clearance between the surface and the plurality of drain holes and recess holes such that water can drain out of the container when the lid and the engaged container are resting on the surface.

20. The lid of claim 19, wherein the plurality of elongated slots are oriented at least partially along a tapered cylindrical shape.

21. The lid of claim 19, wherein an outer perimeter of the lid includes a plurality of motion-preventing segments.

22. The lid of claim 19, further comprising a gasket configured to make a substantially water-tight seal when the lid is engaged with the container.

23. The lid of claim 22, further comprising a gasket-holding rib located on the interior of the gasket.

24. The lid of claim 23, wherein the gasket-holding rib comprises a break.

25. The lid of claim 22, wherein the gasket is removable from the lid.

26. The lid of claim 19, wherein the surface is an upper surface located at least partially upon a plane and the plurality of elongated slots extend at least partially along the vertical dimension away from the plane.

27. A container and lid system comprising:
   a container; and
   the lid of claim 19,
   wherein the container and the lid are configured to engage with each other.

\* \* \* \* \*